No. 609,527. Patented Aug. 23, 1898.
G. WILHELM & J. F. McGOVERN.
COFFEE OR TEA POT HANDLE.
(Application filed Nov. 13, 1897.)
(No Model.)
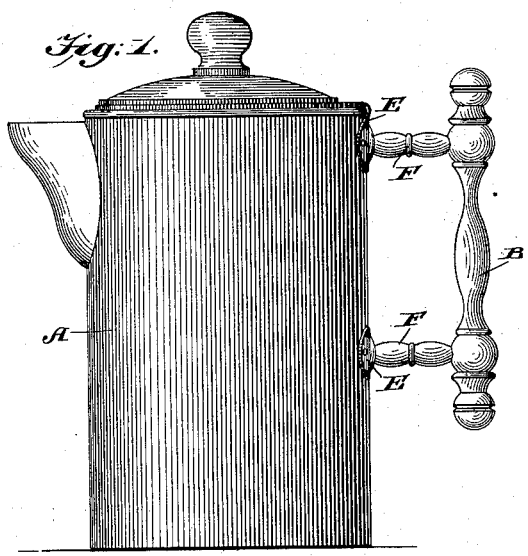
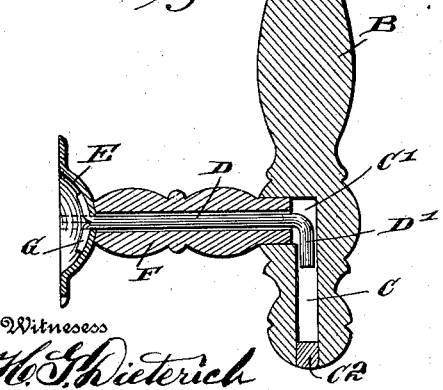
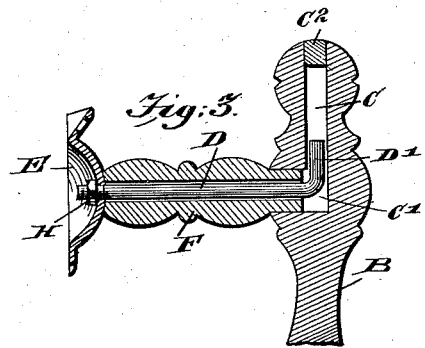
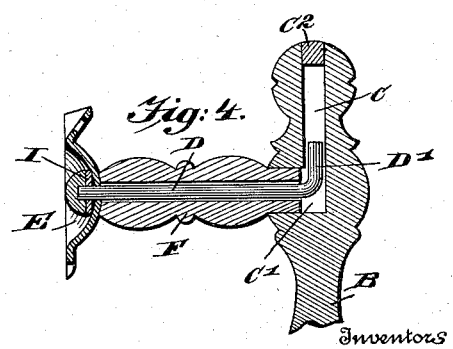
Witnesses
H. T. Dieterich
Chas. B. Brock
Inventors
Geo. Wilhelm
John F. McGovern
by Imarole
Attorneys
THE NORRIS PETERS CO., PHOTO-LITHO., WASHINGTON, D. C.

UNITED STATES PATENT OFFICE.

GEORGE WILHELM AND JOHN F. McGOVERN, OF KOKOMO, INDIANA.

COFFEE OR TEA POT HANDLE.

SPECIFICATION forming part of Letters Patent No. 609,527, dated August 23, 1898.

Application filed November 13, 1897. Serial No. 658,454. (No model.)

*To all whom it may concern:*

Be it known that we, GEORGE WILHELM and JOHN F. MCGOVERN, residing at Kokomo, in the county of Howard and State of Indiana, have invented a certain new and useful Coffee or Tea Pot Handle, of which the following is a specification.

Our invention relates to handles for coffee and tea pots, and has for its object to furnish an improved means for connecting handles of the class known as "cold" handles to the pots, whereby the non-heat-conducting handles are more easily and economically secured in such a manner as to substantially avoid all liability of their coming loose, the joints being such that the handles will remain in position securely held until the pots are worn out.

Our invention consists in the combination of a handle of non-heat-conducting material having a cylindrical bore in each end and a side opening communicating therewith, a pair of hollow sleeves inserted in said side openings, and a pair of wire rods secured at their inner ends to the body of the pot, passing through the sleeves and bent at right angles in the end bores of the handle.

Our invention further consists in the improved construction, arrangement, and combination of parts hereinafter fully described, and afterward specifically pointed out in the claims.

In order to enable others skilled in the art to which our invention most nearly appertains to make and use the same, we will now proceed to describe its construction and operation, having reference to the accompanying drawings, forming part of this specification, in which—

Figure 1 is a view in side elevation of a coffee-pot having a handle made and secured in accordance with our invention. Fig. 2 is a vertical sectional view through the handle removed from the pot. Fig. 3 is a vertical sectional view through the upper part of the handle, illustrating a slight modification in the manner of securing the inner end of the wire rod; and Fig. 4 is a similar view of the same parts with another slight modification of the securing means.

Like letters of reference mark the same parts wherever they occur in the different figures of the drawings.

Referring to the drawings by letters, A is a vessel, in this instance shown as a coffee-pot, to which our improved cold handle B is to be attached, it being understood that the vessel may also be a teapot, pitcher, or any other analogous utensil, and that the handle, while described as made of wood, may be of any other suitable non-heat-conducting material. The handle B has a longitudinal bore or socket C in each end communicating at their inner ends with lateral cylindrical openings C' and plugged up at their outer ends, as at $C^2$.

D are two rods or wires having their outer ends bent at right angles, as at D', and lying in the sockets or bores C', while their inner ends are fastened in ears E, secured to the sides of the pot by soldering or riveting in a manner well known. The main body portions of the rods or wires D pass through sleeves F, made of the same class of material as the handle, having their inner ends abutting against the ears E and their outer ends entered into the lateral openings C' of the handles.

The handle and the various securing means are assembled by first placing the rods D in the lateral openings C' of the handle, then moving them until their body portions are centered in said openings, and their openings D' extending into the longitudinal bores C. The sleeves F are then slipped on the rods D and their outer ends seated in the lateral openings C', the inner ends of the rods extending beyond the inner ends of the sleeves. The ears E are now slipped on these projecting ends of the rods and fastened, after which the ears are secured to the side of the pot.

The ears F may be fastened on the inner ends of the rods D in a number of ways, the three best ways known to me being illustrated. As shown in Fig. 2, the ends of the rods, as at G, are split and are opened out against the inner sides of the ears. As shown in Fig. 3, the fastening is made by threading the inner ends and tightening nuts H upon them. As shown in Fig. 4, washers I are slipped on the ends of the rods and the whole secured by upsetting or riveting the ends. Any other convenient way for fastening these parts may be used.

From the foregoing description it will be obvious that we have provided a simple, cheap, and durable handle for pots and fastening means for the same, and that while securely fastened, the handle will always remain cold and convenient and pleasant to use.

While we have illustrated and described the best means now known to us for carrying out our invention, we wish it to be understood that we do not restrict ourselves to the exact details of construction shown and described, but hold that any slight changes or variations such as might suggest themselves to the ordinary mechanic would clearly fall within the limit and scope of our invention.

Having thus fully described our invention, what we claim as new, and desire to secure by Letters Patent of the United States, is—

1. A handle consisting of an upright of non-heat-conducting material provided with a longitudinal bore at each end, and a lateral bore connecting with the inner end of each of said longitudinal bores, sleeves of analogous material engaging in said lateral bores, and wires or rods connected to the pot at their inner ends passing through said sleeves and having bent ends to enter the longitudinal bores of the upright, substantially as described.

2. The combination of the upright or handle B having longitudinal bores C and lateral bores C' connecting therewith, the sleeves F inserted in said lateral bores, the ears E secured to the pot, and the wires D fastened to the ears at their inner ends and having angular ends D' entering the sockets C, substantially as described.

3. The combination of the upright or handle B having longitudinal bores C and lateral bores C' connecting therewith, the sleeves F inserted in said lateral bores, the ears E secured to the pot, and the wires D fastened to the rods at their inner ends by spreading said ends, and having angular ends D' entering the sockets C, substantially as described.

GEO. WILHELM.
J. F. McGOVERN.

Witnesses:
IDA I. WARD,
CHAS. O. WILLITS.